Figure 3:
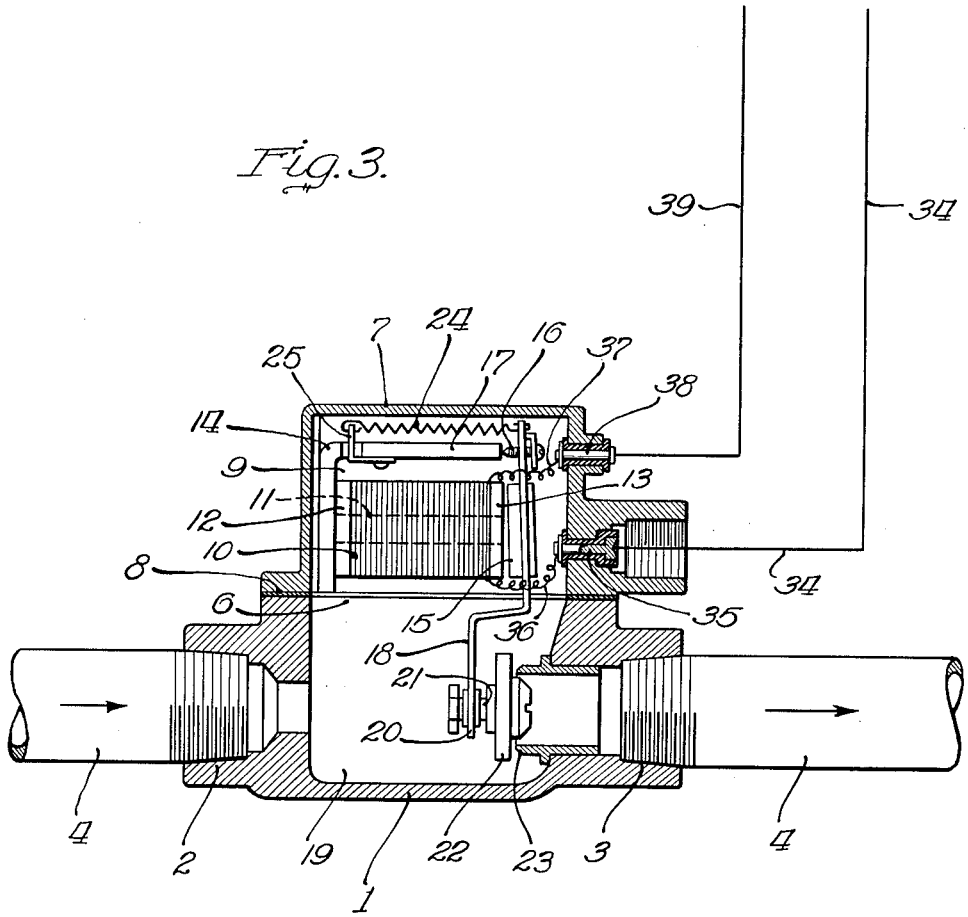

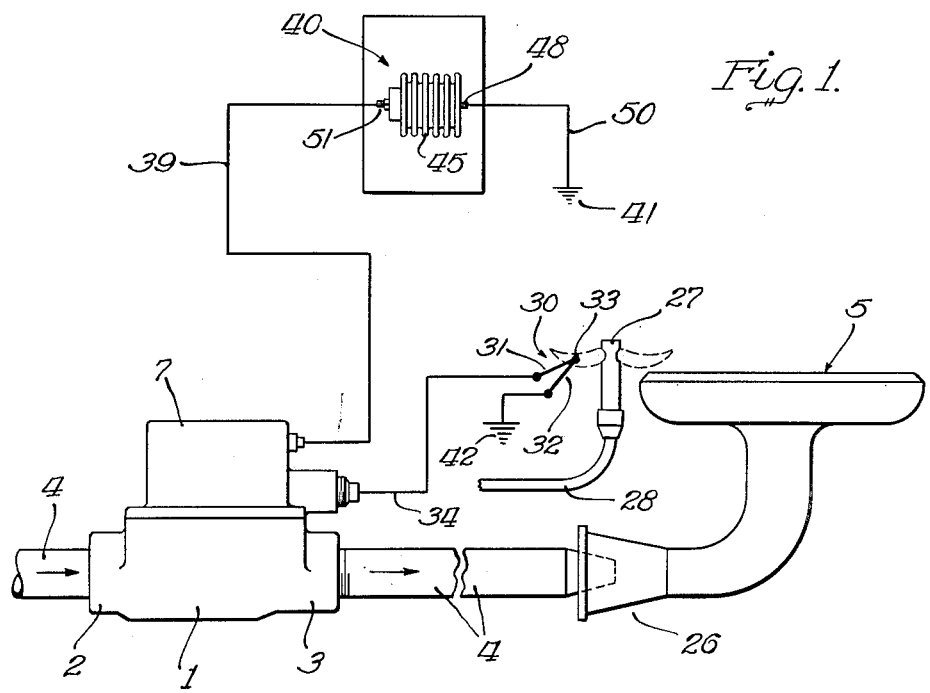
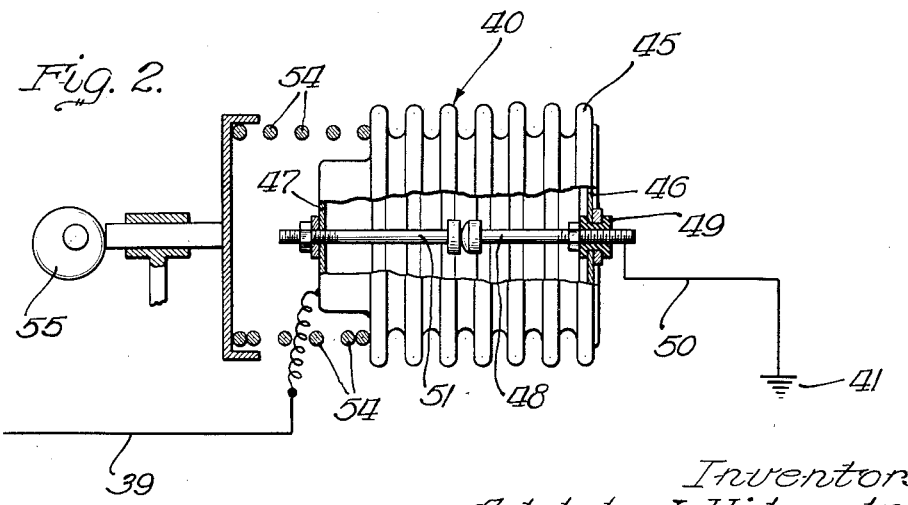

Sept. 6, 1955 A. J. HILGERT ET AL 2,717,123
LOW POWER CONDITION RESPONSIVE CONTROL APPARATUS
Filed May 22, 1952 2 Sheets-Sheet 2

Inventors:
Adolph J. Hilgert and
Russell B. Matthews
BY
Brown, Jackson, Boettcher & Dienner
Attys.

United States Patent Office 2,717,123
Patented Sept. 6, 1955

2,717,123

LOW POWER CONDITION RESPONSIVE CONTROL APPARATUS

Adolph J. Hilgert, Milwaukee, and Russell B. Matthews, Wauwatosa, Wis., assignors to Milwaukee Gas Specialty Company, Milwaukee, Wis., a corporation of Wisconsin Application May 22, 1952, Serial No. 289,242

16 Claims. (Cl. 236—75)

This invention relates, in general, to control apparatus, and more particularly to temperature control apparatus operable by a source of small electric energy independent of an external source of electric current to control, for example, the flow of fluid fuel for burners and the like.

One of the main objects of the present invention is to provide an improved form of condition and more particularly temperature controlling apparatus which includes its own source of small electric energy such as a source of thermoelectric current and provides the desired condition or temperature control without the assistance of fluid pressure and without an external source of electric current.

The elimination of the necessity of an external source of electric current permits operation of the apparatus where an external source of electric current is not available or where it has failed and it eliminates dependence on both an electric utility and a gas utility for operation of the apparatus. Moreover, the necessity for an electrician's service in installation is eliminated and costly and not too dependable electric control components such as transformers and the like are not required. The additional fluid flow controls necessary where the assistance of fluid pressure is required in obtaining the desired control are also eliminated and the apparatus is not subject to leakage or other improper functioning of such additional fluid flow controls.

Another object is to provide control apparatus of the character described which has implicit therein a fail-safe aspect in that if the source of small electric energy fails (i. e., if a pilot burner which heats a thermoelectric generator to provide the desired small electric energy is extinguished) the apparatus automatically shuts off, for example, the flow of fuel to the main burner thereby providing a safety function for the main burner similar to that afforded by a thermoelectric safety shut-off for the main burner and at the same time affording temperature responsiveness without the necessity of other control devices in the fuel stream and without the necessity of an external source of electric current.

Another object is to provide control apparatus of the character described which as compared with the use of a thermoelectric safety shut-off device, with a temperature or condition control powered by an external source of electric current, eliminates the necessity of manually resetting the thermoelectric safety shut-off device.

Another object is to provide the foregoing functions in an all-electric apparatus (i. e., to actuate the main valve, for example, for controlling the flow of fuel to a main burner electrically and directly from the source of thermoelectric current or similar small electric energy as distinguished, for example, from actuation of such a valve through a relay either of the diaphragm valve type or electrically by an external source of electric energy).

Another object is to provide for obtaining the temperature or other condition control, and more particularly, the condition control combined with safety shut-off in apparatus powered from a single thermocouple.

Another object is to obtain the aforementioned functions with a minimum of apparatus of relatively low cost comprising merely:

1. A source of electric energy which of necessity is of small or low power, such as, for example, may be afforded by a single thermocouple.

2. An electromagnetic control device which may be a direct acting electromagnetic valve in which the electromagnetic operator for the valve inherently has a differential between its pick-up and drop-out values.

3. Condition (temperature) responsive means which is preferably of the type in which contacts enclosed or encapsulated and immersed in a volatile fill are connected in series with the electromagnetic control device for controlling the flow of electric energy supplied by the source of small electric energy to the electromagnetic control device and in which these enclosed and immersed contacts as utilized in the present apparatus may function as a variable resistance since in view of the small electric energy involved the circuit and hence the electromagnetic control device may be controlled by merely varying the contact pressure.

Another object is to provide control apparatus of the character described in which even if the circuit had to be opened to cause the electromagnetic control device to drop out, the slow-make, slow-break characteristics would afford certain differential advantages (i. e., the enclosed contacts immersed in the volatile fill on one hand by protecting the contacts and preventing oxides or other layers tending to create contact resistance, make actuation of the electromagnetic control device by the small electric energy circuit possible, while on the other hand the small electric energy circuit by eliminating arcing at the contacts when opened or when at low contact pressure, permitting drop out of the electromagnetic control device, makes possible the enclosure of the contacts in the volatile fill without breaking down the fill).

Another object is to provide improved control apparatus of the character described in which the inherent differential required to pick up and drop out the electromagnetic control device is dependent solely upon the electrical constants of the apparatus, that is, the pick-up and drop-out values of the electromagnetic control device in relation to the contact pressure at the temperature or other condition responsive device.

Another object is to provide an improved control apparatus of the character described in which the aforementioned inherent differential is not only so minimal as to be a very small percentage of the thermal lag of the temperature responsive device herein disclosed, which is lower than that of known devices (thereby affording great sensitivity and quickness in response thus eliminating the necessity for "anticipating" means or the like), but also remains constant throughout the life of the device.

Another object is to provide an improved control device of the character described in which the aforementioned inherent differential is solely an electrical and not a mechanical differential as, for example, inherent in snap-acting temperature responsive means necessary where higher powered circuits are involved and contacts must be broken quickly to minimize arcing.

Another object is to provide an improved control apparatus of the character described in which not only is the aforementioned inherent differential of the apparatus minimal and constant over the life of the apparatus as hereinbefore set forth but is also easy to maintain from apparatus to apparatus in production since the pick-up and drop-out values of the electromagnetic control device are easily maintained and calibrated.

Another object is to provide an improved control apparatus of the character described in which the temperature differential (neglecting negligible rate of change of vapor pressure throughout the operating temperature range) remains constant throughout the operating temperature range since this differential is independent of the relative positioning of the contacts and is dependent only upon contact resistance as determined by contact pressure in relation to the inherent differential of the electromagnetic control device.

Another object is to provide improved control apparatus of the character described in which encapsulation of the contacts in a volatile fill assures constant resistance for given contact pressures whereby the temperature responsive means aside from the thermal lag therein does not contribute to the temperature differential, and contact resistance, if variable at all, merely shifts the range of the device which may be automatically adjusted by a factory range adjustment.

Another object is to provide an improved control apparatus of the character described which will permit use therein of temperature responsive means having enclosed contacts immersed in a volatile fill having, for example, at normal room temperatures, a pressure below atmospheric pressure (these fills have lower pressure change per degree of temperature than higher pressure fills) whereby, if a leak occurs, to increase the resistance of the circuit to a value at which the electromagnetic operator is deenergized so that, for example, the valve will close and shut off the flow of fuel.

Further objects and advantages and numerous adaptations of the invention will appear from the following detailed description taken in connection with the accompanying drawings showing one embodiment of the invention, it being understood that the invention is limited only within the scope of the appended claims and not to the particular embodiment selected for illustration.

In the drawings:

Figure 1 illustrates somewhat schematically a temperature control apparatus powered by a source of small electric energy and embodying the present invention;

Figure 2 is an enlarged view of the temperature responsive means with the enclosure thereof partially broken away to reveal the internal contacts and showing one form of means for varying the temperature range setting of the temperature responsive means; and Figure 3 is a longitudinal sectional view through the valve body and operator housing of the direct acting main valve and electromagnetic operator therefor.

Referring now to the drawings, the embodiment of the invention therein illustrated includes a valve body 1 having a gaseous fuel inlet 2 and a gaseous fuel outlet 3. Contiguous sections of a gaseous fuel supply pipe 4 are connected to the inlet 2 and outlet 3. The section connected to the outlet 3 leads to a main burner 5 located, for example, in the firebox of a furnace or other heater (not shown).

The valve body 1 has an opening 6 which is covered by a cover 7 preferably with a suitable gasket 8 therebetween. The cover 7 encloses an electromagnetic operator 9 which has an inherent differential in the pick-up and drop-out values thereof. The operator 9 comprises a coil 10 wound, for example, around a pair of core pieces one of which is shown at 11 and between a pole piece 12 common to both core pieces at one end and a pair of pole pieces one at the opposite end of each core piece, one of these latter pole pieces being shown at 13. The structure of the power unit of the electromagnetic operator particularly in respect of the pole pieces, core posts, movable armature, coil and thermocouple connected in circuit with the coil may be of the form more fully illustrated and described in the copending application of Donley S. Collins, Gerald E. Dietz and Adolph J. Hilgert, Serial No. 249,778, filed October 4, 1951. Suffice it for purposes of the present application to state that the core preferably has enlarged pole pieces provided with coaxial openings; that the core posts preferably have their opposite ends expanded into the openings and thereafter heat treated to deform and join the grains of metal so that the pole pieces and posts are in substantially one piece; that the coil is wound around the posts and between the pole pieces; that the movable armature is preferably at least equal in area to the pole faces of adjacent pole pieces; and that the thermocouple to be presently described is connected in circuit with the coil.

The assembly comprising the core pieces 11, coil 10 and pole pieces 12 and 13 is carried by one arm of an angular fulcrum bracket 14 which is suitably mounted within the cover 7. The armature 15 is pivoted, for example, by pointed screws 16 on the adjacent end of the arm 17 of the bracket 14 and carries or is attached to a Phosphor bronze flexible spring valve disc arm 18.

The flexible spring arm 18 is preferably of the form more fully disclosed in the copending application of Gerald E. Dietz and Adolph J. Hilgert, Serial No. 292,488, filed June 9, 1952, and as will hereinafter appear acts in accordance therewith. This spring arm 18 has an angular offset portion which extends into the valve chamber 19 and is connected, for example, at 20 to the stem 21 of a main valve member 22. The valve member 22 cooperates with a valve seat 23 at the inner end of the outlet 3 to control the flow of fuel to the main burner 5. The armature 15 is actuated to retracted position with accompanying movement of the valve member 22 to closed position by a coiled spring 24 connected, for example, between a bracket or lug 25 on the bracket 14 and the arm 18.

The delivery of gaseous fuel from the pipe 4 to the burner 5 is preferably by way of a mixing chamber 26 to which air is admitted through adjustable air inlets (not shown) as well understood in the art.

A pilot burner 27 is located in juxtaposition to the main burner 5 to maintain a pilot burner flame for igniting the main burner. The pilot burner 27 is supplied with gaseous fuel by a pilot burner fuel supply pipe 28. The place and manner in which the pilot burner fuel supply pipe 28 is connected to receive fuel, for example, from the pipe 4 is not shown but may follow the arrangement illustrated in the Gerald E. Dietz and Adolph J. Hilgert application previously identified herein, or the arrangement illustrated in the copending application of Russell B. Matthews, Serial No. 246,464, filed September 13, 1951, or any other suitable or preferred practice. The positions of the pilot burner flames are shown in dotted lines.

With the improved control apparatus of the present invention, the automatic electromagnetic operator 9 may be powered by a single thermocouple as shown although a thermopile or other similar source of small electric energy may be employed within certain aspects of the present invention. The thermocouple 30 comprises dissimilar thermocouple elements 31 and 32 joined at 33 to form a "hot" junction which is positioned to be heated by the pilot burner flame. The thermoelectric circuit is from the thermocouple element 31, for example, through a conductor 34 to a terminal stud 35 through a connecting conductor 36 and the coil 10 of the electromagnetic operator 9 and a connecting conductor 37 to a terminal 38 and through a conductor 39 and condition responsive means 40 to ground at 41. The other thermocouple element 32 is shown as grounded at 42. The terminal stud 35 and terminal 38 are shown as carried by and insulated from the cover 7.

The condition responsive means is shown as a temperature responsive device comprising, for example, a hermetically sealed expansible and contractible bellows 45 closed at one end by a fixed or stationary wall 46 and at the opposite end by a movable wall 47. A contact stem 48 extends through the fixed end 46 of the bellows 45 and is insulated therefrom at 49. The outer end of this contact stem 48 is connected to ground at 41 through a conductor 50. The inner end of the stem 48 is shown as rounded to form a contact for contact, for example, with the flat contact surface of a contact at the inner end of a second contact stem 51 which extends out through the movable end 47 of the bellows or enclosure 45. The contact stem 51 is connected in circuit with the terminal 38 through the conductor 39, for example, through the wall of the bellows or enclosure 45 as shown, if desired.

The temperature responsive means may include range adjusting means comprising, for example, spring loading means 54 adapted to bear against the movable end of the bellows 45 and rotatable cam means 55 for varying the rate of spring loading and hence the temperature setting of the device.

The enclosed contacts of the temperature responsive device 40 are immersed in a volatile fluid which fills the bellows or enclosure 45. This volatile fill expands and contracts with accompanying expansion and contraction of the bellows and accompanying movement of the contact 51 relative to the contact 48 upon rise and drop in the ambient temperature where the temperature responsive device is disposed, for example, where it will be subject to the temperature of the air in a room or other space or other medium to the temperature of which the temperature responsive device is responsive.

Reference is directed to the copending application of Adolph J. Hilgert, Serial No. 265,445, filed January 8, 1952, for suitable volatile fluids for filling the container 45 but it is to be understood that the present invention is not limited to the volatile fluids set forth in the aforesaid copending application. Illustrative of the fills mentioned in the foregoing copending application are butane (which is a colorless gaseous compound—$C_4H_{10}$—of the aliphatic hydrocarbon or marsh-gas series), which at 70° F. will exert a pressure of approximately 31 pounds per square inch; isobutane, which at 70° F. will exert a pressure of approximately 45 pounds per square inch; sulphur dioxide ($SO_2$) which at 70° F. will exert a pressure of approximately 50 pounds per square inch; methyl chloride ($CH_3Cl$), which at 70° F. will exert a pressure of approximately 72 pounds per square inch; "S-12" or Freon ($CCl_2F_2$) which at 70° F. will exert a pressure of approximately 85 pounds per square inch; and propane ($C_2H_8$), which at 70° F. will exert a pressure of approximately 120 pounds per square inch. The contacts 48 and 51 are thereby at all times immersed and bathed in the volatile fluid and kept clean and out of contact with surrounding atmospheric conditions so that they will not be deleteriously affected thereby.

The temperature responsive device 40 with its enclosed contacts 48 and 51 immersed in a volatile fill provides slow-make, slow-break contacts in the thermoelectric circuit and as utilized in the apparatus of the present application may function as a variable resistance in the thermoelectric circuit since in view of the small electric energy involved the thermoelectric circuit and hence the electromagnetically controlled valve 22 may be automatically controlled responsive to changes in temperature by merely varying the contact pressure of the contact 51 against the contact 48. Even if the circuit actually had to be opened to cause the electromagnetic control device to drop out, the slow-make, slow-break characteristics will afford certain differential advantages. The enclosed contacts immersed in the volatile fill within the bellows or enclosure on one hand, by protecting the contacts and preventing oxides or other layers tending to create contact resistance, make actuation of the electromagnetic control device by the low power circuit possible, while on the other hand, the low power circuit (which eliminates arcing at the contacts when opened or when a low contact pressure permits drop out of the electromagnetic control device) makes possible the enclosure of the contacts within the bellows or enclosure without breaking down the volatile fill.

All of the foregoing adds up to an apparatus in which the differential required to pick up and drop out the electromagnetic control device neglecting thermal lag of the temperature responsive means is dependent solely upon the electric constants of the apparatus, that is, the pick-up and drop-out values of the electromagnetic control device in relation to the contact pressure in the condition responsive means. The inherent differential is so minimal as to be within the thermal lag range of the temperature responsive device which in and of itself is much lower than in previously known devices. This is so because this differential is an electrical and not a mechanical one, as for example, inherent in snap-acting temperature responsive means necessary where higher powered circuits are involved and contacts must be broken quickly to minimize arcing. In the latter type of device the differential not only includes manufacturing tolerances in the mechanism but also an air gap between the contacts which varies as the contacts wear in use. Moreover, in such devices additional electric energy is necessary to supply the force necessary to overcome the snap mechanism and to power "anticipating" means which must be utilized if the apparatus is to have the required sensitivity. Such extra energy is not available from a thermocouple supplied low power circuit; but, on the other hand, such low power eliminates the necessity for snap-acting means. The apparatus of the present application affords great sensitivity and quickness in response, and provides a minimal differential which remains constant throughout the life of the device.

The present apparatus requires only minimal pressure changes for operation and therefor permits the use of volatile fills having, for example, at normal room temperatures a pressure below atmospheric pressure (these fills have lower pressure changes per degree temprature than higher pressure fills) whereby, if a leak occurs, to increase the resistance of the circuit to a value at which the electromagnetic operator is deenergized so that the valve will close and shut off the flow of fuel.

Reference is directed to the copending application of John A. Wolff, Serial No. 266,626, filed January 16, 1952, for suitable sub-atmospheric fills for the bellows or enclosure for the contacts 48, 51. Illustrative of the sub-atmospheric fills mentioned in this latter copending application are ether, methylene chloride, trichloro trifluoro ethane and isopentane; also isopropyl alcohol, for example, for 180° F. maximum setting, N-propyl alcohol for a 200° F. maximum setting, isobutyl alcohol for a 220° F. maximum setting, N-butyl alcohol for a 240° F. maximum setting, isoamyl alcohol for a 260° F. maximum setting, M-xylene for a 280° F. maximum setting, or P-cymene for a 330° F. maximum setting.

The inherent differential required to pick up and drop out the electromagnetic control device is not only minimal and constant over the life of the apparatus but is easy to maintain from apparatus to apparatus in production since the pick-up and drop-out values of the electromagnetic control device are easily maintained and calibrated. Moreover, the temperature differential of the apparatus (neglecting negligible rate of change of vapor pressure throughout the operating temperature range) remains constant through the operating temperature range since this differential is independent of the relative position of the contacts and is dependent only upon contact resistance as determined by contact pressure in relation to the inherent differential of the electromagnetic control device. The encapsulation of the contacts inside the bellows or enclosure assures constant resistance for given contact pressures and thus the temperature responsive means aside from the thermal lag therein does not contribute to the temperature differential and the contact resistance, if variable at all, merely shifts the range of the device which may be adjusted.

Operation of the illustrated apparatus is as follows:
When the temperature, for example, of the air or other medium surrounding the bellows 45 falls below that set, for example, by the cam 55, the bellows contracts under the influence of the loading spring 54. The contact 51 gradually closes against contact 48 and the contact pressure builds up, for example, from about 0 pounds' pressure to at least the pressure where the resistance of the thermocouple circuit is reduced to a value at which the electromagnetic operator 9 is energized by the thermoelectric energy from the thermocouple 30 (about twenty millivolts is generated by the heat of a pilot burner flame on one form of single thermocouple now marketed by Milwaukee Gas Specialty Company, assignee of the present application) and actuates the armature 15 to attracted position. With, for example, silver contacts, a contact pressure of only a few grams reduces the contact resistance to a very low value. The relation between contact pressure and contact resistance will vary for different shapes of contacts and for various contact materials.

As well known in the art, the pull of the armature 15 increases exponentially as it approaches the pole faces of the pole pieces 13 when the electromagnet is thus energized. This pull-in force is stored in the flexible spring arm 18 until the pull on the armature 15 exceeds the force of the gas pressure plus the sealing force of the coiled spring 24 which may be about 15 grams, and the valve disc 22 then snaps to open position. The spring arm 18 therefore allows greater movement of the armature 15 with resulting increase in valve opening movement and resulting greater capacity.

Upon rise of the order of a few tenths of a degree Fahrenheit or less in the temperature at the temperature responsive means above that set by the cam 55, the bellows 45 expands and reduces the pressure of the contact 51 against the contact 48 at least to where the resistance of the thermocouple circuit is increased to a value where the electromagnetic operator 9 is deenergized and the valve 22 is actuated to closed position, for example, by the spring 24.

If in the embodiment of the invention selected for illustration at any time the flame of the pilot burner 27, which normally should burn constantly, becomes extinguished, thereby creating an unsafe condition, the thermocouple 30 will be deenergized and the flow of energizing thermoelectric current in the coil of the electromagnetic control device will be discontinued. When this occurs, the spring 24 actuates the armature 15 to retracted position and the valve 22 to closed position to provide safety shut-off for the fuel for the main burner. After the pilot burner is reignited and the temperature responsive means calls for heat, the valve is automatically opened without the necessity of means for manually resetting it to open position.

The embodiment of the invention shown in the drawings for illustrative purposes only and it is to be expressly understood that said drawings and the accompanying specification are not to be construed as a definition of the limits or scope of the invention, reference being had to the appended claims for that purpose.

We claim:

1. Condition control apparatus including a low resistance electric circuit wherein the inherent differential of the apparatus is determined solely by the electric constants of the circuit comprising, in combination, condition responsive means having in said circuit enclosed low resistance contacts at which the resistance of said circuit is varied, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

2. Condition control apparatus including a low resistance electric circuit wherein the inherent differential of the apparatus is determined solely by the electric constants of the circuit comprising, in combination, condition responsive means having in said circuit enclosed low resistance contacts at which the resistance of said circuit is varied, said low resistance contacts being enclosed in an enclosure containing a volatile fill immersing said contacts, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

3. Condition control apparatus including a low resistance electric circuit wherein the inherent differential of the apparatus is determined solely by the electric constants of the circuit comprising, in combination, condition responsive means having in said circuit enclosed low resistance contacts at which the resistance of said circuit is varied, said low resistance contacts being enclosed in an enclosure containing a volatile fill immersing said contacts, said volatile fill, at normal temperatures, having a pressure below atmospheric pressure, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

4. Temperature control apparatus including a low resistance electric circuit wherein the inherent differential of the apparatus is determined solely by the electric constants of the circuit comprising, in combination, temperature responsive means having in said circuit enclosed low resistance contacts at which the resistance of said circuit is varied, a main valve for directly controlling a main flow of fluid, a single thermocouple for energizing said circuit, and an electromagnetic operator under direct control of said temperature responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to temperature changes.

5. Temperature control apparatus including a low resistance electric circuit wherein the inherent differential of the apparatus is determined solely by the electric constants of the circuit comprising, in combination, temperature responsive means having in said circuit enclosed low resistance contacts at which the resistance of said circuit is varied, said low resistance contacts being enclosed in an enclosure containing a volatile fill immersing said contacts, a main valve for directly controlling a main flow of fluid, a single thermocouple for energizing said circuit, and an electromagnetic operator under direct control of said temperature responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to temperature changes.

6. Temperature control apparatus including a low resistance electric circuit wherein the inherent differential of the apparatus is determined solely by the electric constants of the circuit comprising, in combination, temperature responsive means having in said circuit enclosed low resistance contacts at which the resistance of said circuit is varied, said low resistance contacts being enclosed in an enclosure containing a volatile fill immersing said contacts, said volatile fill, at normal temperatures, having a pressure below atmospheric pressure, a main valve for directly controlling a main flow of fluid, a single thermocouple for energizing said circuit, and an electromagnetic operator under direct control of said temperature responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to temperature changes.

7. Condition control apparatus including a low resistance electric circuit wherein the inherent differential of the apparatus is determined solely by the electric constants of the circuit comprising, in combination, condition responsive means having in said circuit enclosed low resistance contacts, means for varying the contact pressure between said low resistance contacts to vary the contact resistance and thereby the current flow in said low resistance circuit, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

8. Temperature control apparatus including a low resistance electric circuit wherein the inherent differential of the apparatus is determined solely by the electric constants of the circuit comprisig, in combination, temperature responsive means having in said circuit enclosed low resistance contacts, means for varying the contact pressure between said low resistance contacts to vary the contact resistance and thereby the current flow in said low resistance circuit, a main valve for directly controlling a main flow of fluid, a single thermocouple for energizing said circuit, and an electromagnetic operator under direct control of said temperature responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to temperature changes.

9. Condition control apparatus including a low resistance electric circuit wherein the inherent differential of the apparatus is determined solely by the electric constants of the circuit comprising, in combination, condition responsive means having in said circuit enclosed low resistance contacts, means for varying the contact pressure between said low resistance contacts to vary the contact resistance and thereby the current flow in said low resistance circuit, said low resistance contacts being enclosed in an enclosure containing a volatile fill immersing said contacts, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

10. Condition control apparatus including a low resistance electric circuit wherein the inherent differential of the apparatus is determined solely by the electric constants of the circuit comprising, in combination, condition responsive means having in said circuit enclosed low resistance contacts, means for varying the contact pressure between said low resistance contacts to vary the contact resistance and thereby the current flow in said low resistance circuit, said low resistance contacts being enclosed in an enclosure containing a volatile fill immersing said contacts, said volatile fill, at normal temperatures, having a pressure below atmospheric pressure, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

11. Condition control apparatus including a low resistance electric circuit wherein the inherent differential of the apparatus is determined solely by the electric constants of the circuit comprising, in combination, condition responsive means having in said circuit enclosed low resistance contacts at which the resistance of said circuit is varied, a main valve for directly controlling a main flow of fluid, a single thermocouple for energizing said circuit, and an electromagnetic operator under direct control of said condition responsive means, an armature for said electromagnetic operator, said armature having retracted and attracted positions, energy storing means connected to said valve and reacting in a direction for moving said valve from a first position to a second position, a connection between said armature and said energy storing means whereby the energy stored thereby increases in the movement of said armature toward said electromagnetic operator responsive to energization thereof, the energy stored in said energy storing means by movement of said armature to said electromagnetic operator becoming effective for moving said valve from its first position when said armature approaches its fully attracted position, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

12. Condition control apparatus including a low resistance electric circuit wherein the inherent differential of the apparatus is determined solely by the electric constants of the circuit comprising, in combination, condition responsive means having in said circuit enclosed low resistance contacts at which the resistance of said circuit is varied, a main valve for directly controlling a main flow of fluid, a single thermocouple for energizing said circuit, said main valve having means imparting sufficient sealing force thereto in closed position for safety shut-off of said main flow of fluid upon failure of said temperature responsive means or said circuit or deenergization of said thermocouple, and an electromagnetic operator under direct control of said condition responsive means, said electromagnetic operator being energized by electric energy from said thermocouple and acting electrically and directly to open said valve against said sealing force at values of said resistance below a given value and deenergized to release said valve at resistance values above a given value, the difference between said resistance values being the sole inherent determinant of the differential of the apparatus, thereby affording the apparatus extreme sensitivity to condition changes.

13. Condition control apparatus including a low resistance electric circuit wherein the inherent differential of the apparatus is determined solely by the electric constants of the circuit comprising, in combination, condition responsive means having in said circuit low resistance contacts at which the resistance of said circuit is varied, means maintaining at said contacts constant temperature-resistance relationships throughout the life of said condition responsive means, a main valve for directly controlling a main flow of fluid, a single thermocouple for energizing said circuit, and an electromagnetic operator under direct control of said condition responsive means, said electromagnetic operator being energized by electric energy from said thermocouple and acting electrically and directly to operate said valve at values of said resistance below a given value and deenergized to release said valve at resistance values above a given value, the difference between said resistance values being the sole inherent determinant of the differential of the apparatus, thereby affording the apparatus extreme sensitivity to condition changes.

14. Control apparatus comprising, in combination, a low resistance electric circuit, condition responsive means having in said circuit enclosed low resistance contacts at which the resistance of said circuit is varied, a main valve for directly controlling a main flow of fluid, a single thermocouple for energizing said circuit, and an electromagnetic operator under the direct control of said condition responsive means, said electromagnetic operator being energized by electric energy from said thermocouple and acting electrically and directly to operate said valve at values of said resistance below a given value and deenergized to release said valve at resistance values above a given value.

15. Control apparatus comprising, in combination, a low resistance electric circuit, condition responsive means having in said circuit enclosed low resistance contacts at which the resistance of said circuit is varied, and having means for varying the contact pressure between said low resistance contacts to vary the contact resistance and thereby the current flow in said low resistance circuit, a main valve for directly controlling a main flow of fluid, a single thermocouple for energizing said circuit, and an electromagnetic operator under the direct control of said condition responsive means, said electromagnetic operator being energized by electric energy from said thermocouple and acting electrically and directly to operate said valve at values of said resistance below a given value and deenergized to release said valve at resistance values above a given value.

16. Control apparatus comprising, in combination, a low resistance electric circuit, condition responsive means having in said circuit enclosed low resistance contacts at which the resistance of said circuit is varied, a main valve for directly controlling a main flow of fluid, a single thermocouple for energizing said circuit, said main valve having means imparting sufficient sealing force thereto in closed position for safety shut-off of said main flow of fluid upon failure of said condition responsive means or said circuit or deenergization of said thermocouple, and an electromagnetic operator under the direct control of said condition responsive means, said electromagnetic operator being energized by electric energy from said thermocouple and acting electrically and directly to open said valve against said sealing force at values of said resistance below a given value and deenergized to release said valve at resistance values above a given value.

References Cited in the file of this patent

UNITED STATES PATENTS

| Number | Name | Date |
|---|---|---|
| 360,823 | Singer | Apr. 5, 1887 |
| 582,267 | Canellopoulos | May 11, 1897 |
| 1,109,996 | Kuhlmann | Sept. 8, 1914 |
| 1,265,765 | Ferris | May 14, 1918 |
| 1,822,408 | King | Sept. 8, 1931 |
| 2,112,750 | Price | Mar. 29, 1938 |
| 2,129,937 | Johnson | Sept. 13, 1938 |
| 2,274,938 | Ray | Mar. 3, 1942 |
| 2,349,443 | McCarty | May 23, 1944 |